3,379,733
N-(ω-AMINOALKYL)ISOINDOLES AND METHOD
FOR PREPARING SAME
William J. Houlihan, Mountain Lakes, N.J., assignor to
Sandoz Inc., Hanover, N.J.
No Drawing. Filed Dec. 7, 1965, Ser. No. 512,224
8 Claims. (Cl. 260—326.1)

The present invention is directed to the reduction of compounds of the formula

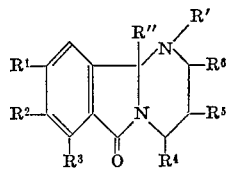

I wherein
each of $R^1$, $R^2$ and $R^3$ is, independently, either a hydrogen atom (—H) or a lower straight chain alkyl preferably having from 1 to 4 carbon atoms, e.g. methyl, ethyl, propyl and butyl;
each of $R^4$, $R^5$ and $R^6$ is, independently, either a hydrogen atom (—H) or a lower straight chain alkyl, preferably having from 1 to 4 carbon atoms, e.g. methyl, ethyl, propyl and butyl;
$R'$ is either a hydrogen atom (—H) or a lower straight chain alkyl, preferably having from 1 to 4 carbon atoms, e.g. methyl, ethyl, propyl and butyl;
$R''$ is either phenyl or phenyl substituated in at least one of the positions 3-, 4- and 5, any substituent being, independently, either methyl, ethyl, propyl, a chlorine atom (—Cl) or a fluorine atom (—F); and
to the therapeutically active reduction product

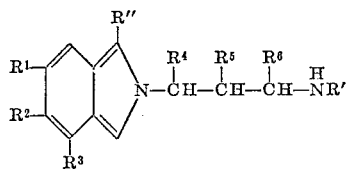

II and to the pharmaceutically acceptable acid addition salts of compounds II.

Compounds I are reduced with a hydride reducing agent, e.g. lithium aluminum hydride (LAH), in an ether solvent. The particular ether employed as solvent for the reduction is not critical, as long as it is inert with respect to both the starting material and the reduction products under the employed conditions. Exemplary contemplated ethers are diethylether, dibutylether and tetrahydrofuran (THF).

The reaction is carried out at reflux temperature. The reaction is from 2 to 24 hours.

Compounds I are prepared either (A) by reacting an o-benzoylbenzoyl chloride III (a substance which can exist in tautomeric forms IIIa and IIIb) with an alkylene diamine IV and subsequently subjecting the product V to ring closure according to the reaction scheme:

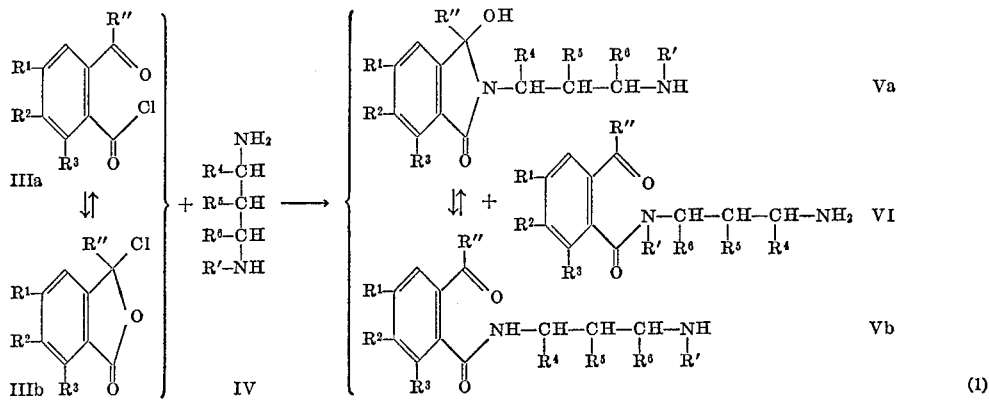

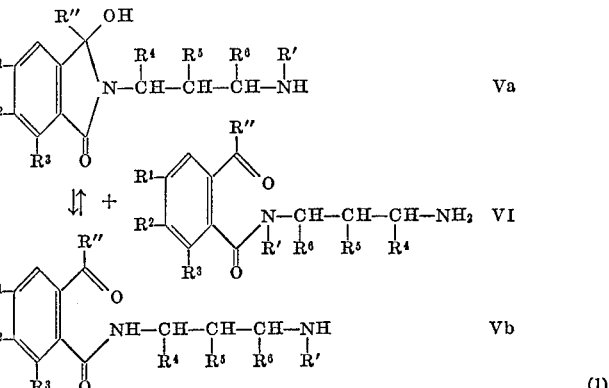

(1)

V→I (2)

or (B) by reacting an o-benzoylbenzoic acid VII directly with an alkylene diamine IV according to the reaction scheme:

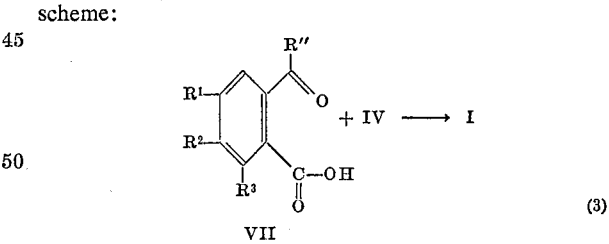

(3)

In each of the reaction schemes 1, 2 and 3 all symbols have their above-ascribed meanings. Reaction 1 is carried out in a polar solvent (which is inert to the reactants and the reaction products V and VI) with or without an acid-binding agent, such as pyridine, alkylpyridine and quinoline. Suitable reaction temperatures are from room temperatures to the poiling point of the solvent employed. It is important to maintain the reaction medium at less than 5 percent by weight (based on the total weight of the amine reactant) of water. The reaction usually takes in excess of 6 hours.

Any polar solvent for the reactants may be used for reaction 1 as long as the solvent is inert to, i.e. does not react with, either the reactants or the reaction products under the conditions employed. Suitable solvents are dimethylformamide (DMF), diethylformamide, dioxane, chlorobenzene and pyridine.

Product V, which exists in either tautomeric form Va or Vb, need not be isolated for reaction 2, which is also effected in a solvent system. The solvent system for reaction 2 contains a catalytic amount of hydrogen ions.

When R' is alkyl, a mixture of products V and VI may result from reaction 1, depending upon which amino function of IV reacts with III.

In addition to the solvents contemplated for reaction 1, further solvents, such as benzene, alkylbenzenes, chlorobenzene, dichlorobenzene, cycloakanes, tetralin and other high-boiling hydrocarbons, are useful for reaction 2. This reaction is, likewise, conveniently carried out at a temperature from room temperature to the boiling point of the selected solvent system.

To provide a hydrogen ion source, either an organic or inorganic acid may be used. Para-toluenesulfonic acid is preferred, but other acids, such as alkane sulfonic, e.g. methane sulfonic; arylsulfonic, e.g. phenylsulfonic; phosphoric; acid ion exchange resin, e.g. "Dowex-50"; acid activated aluminasilicates, e.g. "TONSIL," also produce favorable results.

Reaction 3, which is preferred when R' is other than a hydrogen atom, is effected in an inert solvent with or without a catalytic amount of hydrogen ions. The solvents are the same as those indicated for reaction 2.

Compounds III, IV and VII are either known compounds or are readily prepared by established procedures from available compounds.

Compounds II are 2-γ-aminopropyl-1-phenyl-isoindoles. They and their pharmaceutically acceptable acid addition salts are useful as CNS stimulant-antidepressants and analgesic/anti-inflammatories. They are administered either orally or parenterally in standard dosage forms in daily doses of from 50 to 250 milligrams.

Each of the pharmaceutically active compounds of this invention, may be, e.g., incorporated, for oral administration, in a tablet as the sole active ingredient. A typical tablet is constituted by from 1 to 3 percent binder, e.g. tragacanth; from 3 to 10 percent disintegrating agent, e.g. corn starch; from 2 to 10 percent lubricant; e.g. talcum; from 0.25 to 1.0 percent lubricant, e.g. magnesium stearate; an average dosage of active ingredient; and q.s. 100 percent of filler, e.g. lactose; all percentages being by weight. Tablets are prepared according to standard tabletting techniques, which are well-known in the art, employing the necessary amounts of conventional granulating liquids, e.g. alcohol SD-30 and purified water. An exemplary tabletting formulation for the instant active compounds is:

| | Parts |
|---|---|
| Title compound of Example 3 | 50 |
| Tragacanth | 2 |
| Lactose | 39.5 |
| Corn starch | 5 |
| Talcum | 3 |
| Magnesium stearate | 0.5 |
| Alcohol SD-30 | Q.s. |
| Purified water | |

Among the pharmaceutically acceptable acid addition salts are salts of organic acids, e.g. tartaric acid; inorganic acids, e.g. hydrochloric acid, hydrobromic acid and sulfuric acid; monobasic acids, e.g. an alkanesulfonic acid, such as methanesulfonic acid ($H_3C-SO_3H$); dibasic acids, e.g. succinic acid; tribasic acids, e.g. phosphoric acid and citric acid; saturated acids, e.g. acetic acid; ethylenically unsaturated acids, e.g. maleic acid and fumaric acid; and aromatic acids, e.g. salicylic acid and arylsulfonic acids, such as benzenesulfonic acid. The only limitation on the acid selected is that the resulting acid addition salt be pharmaceutically acceptable; the acid does not nullify the therapeutic properties of compounds II.

Preparing an acid addition salt from a free base and freeing a base from an acid addition salt thereof are established procedures which, per se, are not of the essence with respect to the instant invention.

Compounds II have an asymmetric center for each of $R^4$, $R^5$ and $R^6$ which is other than a hydrogen atom. All compounds II which have at least one asymmetric carbon exist as racemates and as optical antipodes (enantiomers). The optically active isomers and mixtures of same are within the scope of this invention. Resolution of racemates or racemic mixtures into optically active components is effected according to procedures well-known to the art-skilled and, per se, is not an essential feature of this invention.

In addition compounds of the formula

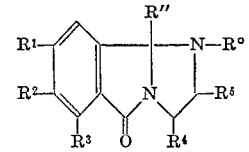

VIII wherein each of $R^1$, $R^2$, $R^3$, $R^4$, $R^5$ and $R''$ has its above-ascribed meaning and $R°$ is lower straight chain alkyl, preferably having from 1 to 4 carbon atoms, e.g. methyl, ethyl, propyl and butyl, which are prepared in the same manner as compounds I from corresponding starting materials (either known or readily prepared from available compounds) are likewise reduced (under the same conditions as indicated to obtain compounds II) to correpsonding compounds of the formula

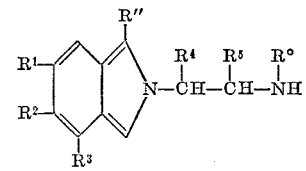

IX

If $R°$ were a hydrogen atom, the reduction product would have a materially different structure.

Compounds IX are useful as CNS stimulant-antidepressants, and analgesic/anti-inflammatories and can be administered in the same manner and same dosages as compounds II.

In the examples which follow, the parts and percentages are by weight unless otherwise specified, and the temperatures are in degrees centigrade. The relationship between parts by weight and parts by volume is the same as that between the kilogram and the liter.

Example 1.—10b-phenyl-1,2,3,4-tetrahydropyrimido [2,1-a]isoindolin-6(10bH)-one

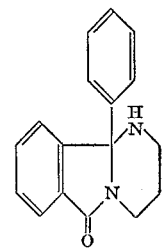

Admix 22.2 parts (0.10 mole) of o-benzoylbenzoic acid with 8.2 parts (0.11 mole) of 1,3-diaminopropane, 150 parts by volume of toluene and 1.1 part of p-toluenesulfonic acid in a flask equipped with a stirrer and a Dean-Stark tube. Stir and reflux until water fails to separate. Remove the solvent in vacuo. Crystallize the residue from methanol to obtain the title compound, melting point (M.P.) 181° to 185°.

Replacing the 1,3-diaminopropane with an equivalent of either 1 - amino - 1,3 - dimethyl - 3 - methylaminopropane or 1,3-damino-2-ethylpropane results in the preparation, is similar manner, of the corresponding compound I.

Example 2.—10b-(p-chlorophenyl)-1,2,3,4-tetrahydropyrimido[2,1-a]isoindolin-6(10bH)-one

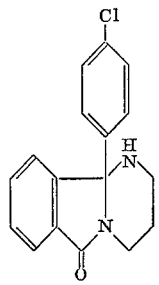

Admix 10.4 parts (0.04 mole) of o-(p-chlorobenzoyl) benzoic acid with 4.44 parts (0.06 mole) of propylene diamine, 150 parts by volume of toluene and 0.5 part of p-toluenesulfonic acid in a flask equipped with a Dean-Stark tube. Stir and reflux until water fails to separate from the condensate. Remove the solvent in vacuo. Crystallize the residue from methanol/water to obtain the title compound, M.P. 160° to 162°.

Replacing the o-(p-chlorobenzoyl)benzoic acid with an equivalent of either 4,6 - dimethyl - 2 - (3 - fluorobenzoyl)benzoic acid or 2 - (3,5-dimethylbenzoyl)-5-ethylbenzoic acid results in the preparation, in similar manner, of the corresponding compound I.

Example 3.—1-p-chloro-phenyl-2-(3-aminopropyl) isoindole hydrochloride

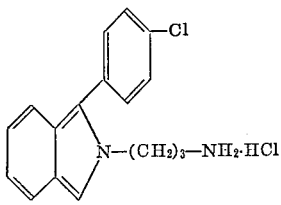

Equip a four-neck round bottom flask with a stirring apparatus, dropping funnel, reflux condenser, Soxhlet tube and a gas inlet tube. Charge the Soxhlet tube with 15 parts (0.05 mole) of 10b-p-chlorophenyl-1,2,3,4-tetrahydropyrimido[2,1 - a]isoindolin - 6(10bH) - one (title compound of Example 2) and the flask with 5.0 parts (0.13 mole) of LAH and 500 parts by volume of anhydrous diethylether. Blanket the mixture in the flask with nitrogen before stirring and refluxing same for 18 hours.

Cool the thus-refluxed material with an ice bath and then add to said material 50 parts by volume of ethyl acetate, 10 parts by volume of 2 N (aq.) sodium hydroxide and 15 parts by volume of water. Add anhydrous sodium sulfate to the thus-obtained crude salt mixture. Filter the salt from the resultant.

Remove the ether from the filtrate in vacuo on a rotary evaporator to obtain 14.4 parts of the free base of the title compound as a blue-green oil. Dissolve the oil in anhydrous diethylether, cool the resulting solution in an ice bath and pass a stream of hydrogen chloride gas through the thus-cooled solution. Filter off the resulting crude title compound, which is thus precipitated, and recrystallize same from 95% ethanol to obtain the title compound as a blue-green solid, M.P. 260° to 262°.

Replacing the 10b - p - chlorophenyl - 1,2,3,4 - tetrahydropyrimido[2,1 - a]isoindolin - 6(10bH) - one with an equivalent of either 10b - p - tolyl - 1,3,7,9 - tetramethyl - 1,2,3,4-tetrahydropyrimido[2,1 - a]isoindolin-6(10bH) - one or 10b - (3,5 - dischlorophenyl) - 2,4,8-trimethyl - 1,2,3,4 - tetrahydropyrimido [2,1 - a]isoindolin - 6(10bH) - one results in the preparation, in similar manner, of the corresponding compound II.

Example 4.—1-ethyl-9b-phenyl-imidazolo[1,2-a] isoindol-5-one

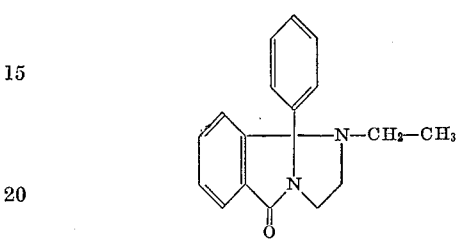

Admix 11.3 parts (0.05 mole) of o-benzoylbenzoic acid with 7.2 parts (0.075 mole) of N-ethyl-ethylenediamine, 150 parts by volume of toluene and 0.5 part of p-toluenesulfonic acid in a flask equipped with a stirrer and a Dean-Stark tube. Stir and reflux until water fails to separate from the condensate. Remove the solvent in vacuo. Crystallize the residue from methanol-water to obtain the title compound, M.P. 113° to 115.5°.

Replacing the o-benzoylbenzoic acid with an equivalent of o-(p-chlorobenzoyl)benzoic acid results in the preparation, in similar manner, of the corresponding product. Replacing the N-ethyl-ethylenediamine with an equivalent of 1 - amino-1-methyl-2-methylaminoethane results in the preparation, in similar manner, of the corresponding product.

Example 5.—1-phenyl-2-(2-N-ethylaminoethyl) isoindole

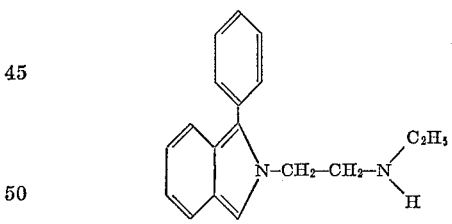

Equip a four-necked round bottom flask with a stirring apparatus, dropping funnel, reflux condenser, Soxhlet tube and a gas inlet tube. Charge the Soxhlet tube with 5.0 parts (0.018 mole) of the title compound of Example 4 and the flask with 1.7 parts (0.045 mole) of LAH and 500 parts by volume of anhydrous diethylether. Blanket the mixture in the flask with nitrogen before stirring and refluxing same for 17 hours.

Cool the thus-refluxed material with an ice bath and then add to said material 20 parts by volume of ethylacetate, 3 parts by volume of 2 N (aq.) sodium hydroxide and 5 parts by volume of water. Add anhydrous sodium sulfate to the thus-obtained crude salt mixture. Filter the salt from the resultant.

Remove the ether from the filtrate in vacuo on a rotary evaporator to obtain the title compound as a yellow-orange semi-solid material.

Replacing the title compound of Example 4 with an equivalent of 1 - methyl - 9b - p - chlorophenyl - imidazolo[1,2-a]isoindol-5-one results in the preparation, in similar manner, of the corresponding product.

Various changes may be made in the structure of compounds II and in the process for their preparation without

What is claimed is:
1. A process for preparing a compound of the formula

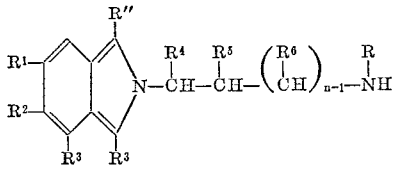

which comprises contacting a compound of the formula

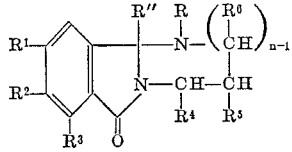

wherein
R is lower straight chain alkyl when $n$ is 1 and is a member selected from the group consisting of a hydrogen atoms and lower straight chain alkyl when $n$ is 2;
each of $R^1$, $R^2$ and $R^3$ is, independently, a member selected from the group consisting of a hydrogen atom and lower straight chain alkyl;
each of $R^4$, $R^5$ and $R^6$ is, independently, a member selected from the group consisting of a hydrogen atom and lower straight chain alkyl;
R" is a member selected from the group consisting of unsubstituted phenyl and phenyl substituted in at least one of the positions 3-, 4- and 5-, each substituent being independently selected from the group consisting of methyl, ethyl, propyl, a chlorine atom and a fluorine atom; and
$n$ is one of the integers 1 and 2, with lithium aluminum hydride in an inert ether solvent and at reflux temperature.

2. A process according to claim 1 wherein $n$ is 2.

3. A pharmaceutically acceptable compound selected from the group consisting of compounds of the formula

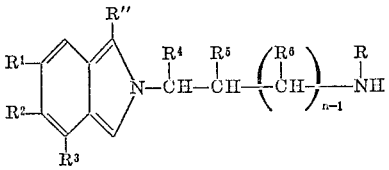

wherein
R is lower straight chain alkyl when $n$ is 1 and is a member selected from the group consisting of a hydrogen atom and lower straight chain alkyl when $n$ is 2;
each of $R^1$, $R^2$ and $R^3$ is, independently, a member selected from the group consisting of a hydrogen atom and lower straight chain alkyl;
each of $R^4$, $R^5$ and $R^6$ is, independently, a member selected from the group consisting of a hydrogen atom and lower straight chain alkyl;
R" is a member selected from the group consisting of unsubstituted phenyl and phenyl substituted in at least one of the positions 3-, 4- and 5-, each substituent being independently selected from the group consisting of methyl, ethyl, propyl, a chlorine atom and a fluorine atom and
$n$ is one of the integers 1 and 2, and the acid addition salts thereof.

4. A compound according to claim 3 wherein $n$ is 2.
5. The compound according to claim 4 which is 1-p-chlorophenyl-2-(3-aminopropyl)isoindole.
6. The compound according to claim 4 which is 1-p-phenyl-2-(2-N-ethylaminoethyl)isoindole.
7. A compound according to claim 3 wherein $n$ is 1.
8. The compound according to claim 7 which is 1-phenyl-2-(2-N-ethylaminoethyl) isoindole.

References Cited

UNITED STATES PATENTS 3,031,458   4/1962   Huebner _____ 260—326.1

ALEX MAZEL, *Primary Examiner.*

NICHOLAS S. RIZZO, *Examiner.*

M. O'BRIEN, J. NARCAVAGE, *Assistant Examiners.*